United States Patent [19]

Manno

[11] 4,209,933
[45] Jul. 1, 1980

[54] FISHING RIG ASSEMBLY

[76] Inventor: Joseph T. Manno, Star Rte., Kane, Pa. 16735

[21] Appl. No.: 933,503

[22] Filed: Aug. 14, 1978

Related U.S. Application Data

[63] Continuation-in-part of Ser. No. 779,547, Mar. 21, 1977, Pat. No. 4,107,866.

[51] Int. Cl.² .............................................. A01K 91/04
[52] U.S. Cl. .................................. 43/43.15; 43/44.83; 43/44.85
[58] Field of Search .................... 43/43.1, 43.15, 44.83, 43/44.84, 44.85, 44.87; 24/129 R, 129 B, 129 C, 71.3

[56] References Cited

U.S. PATENT DOCUMENTS

| | | | |
|---|---|---|---|
| 585,564 | 6/1897 | Freeman | 43/43.1 X |
| 1,047,654 | 12/1912 | Klersy | 43/44.85 |
| 1,153,053 | 9/1915 | Forster | 43/44.85 |
| 2,202,976 | 6/1940 | Wise | 43/44.85 |
| 2,227,420 | 1/1941 | Augenblick | 43/44.85 |
| 2,569,312 | 9/1951 | Holm | 43/44.84 |
| 3,327,423 | 6/1967 | Kotis | 43/44.83 X |
| 4,107,866 | 8/1978 | Manno | 43/44.85 |

OTHER PUBLICATIONS

Bradshaw, Hank, "12 Foolproof Ways to Rig a Fishline", *Popular Science*, vol. 187, Jul. 1965.

*Primary Examiner*—Nicholas P. Godici
*Attorney, Agent, or Firm*—Cushman, Darby & Cushman

[57] ABSTRACT

A fishing rig assembly including a hook, a first line connected to the hook, a sinker attachment structure, a sinker, and a second line connected to the sinker and to the sinker attachment structure. The sinker attachment structure provides for ready adjustment of the sinker along the first line and includes an integral body having a generally T-shaped projection with first and second surface manifestation formed on either side of the generally T-shaped projection, in line with each other and the projection, and the surface manifestations and projection being spaced a fixed predetermined distance apart. The second line includes a looped end which is disposed around the generally T-shaped projection, and the first line is received by the first and second manifestations, and is wrapped around the generally T-shaped projection between the surface manifestations. The hook can also include a generally T-shaped projection and a cooperating surface manifestation to allow adjustment of the hook position along the first line.

9 Claims, 3 Drawing Figures

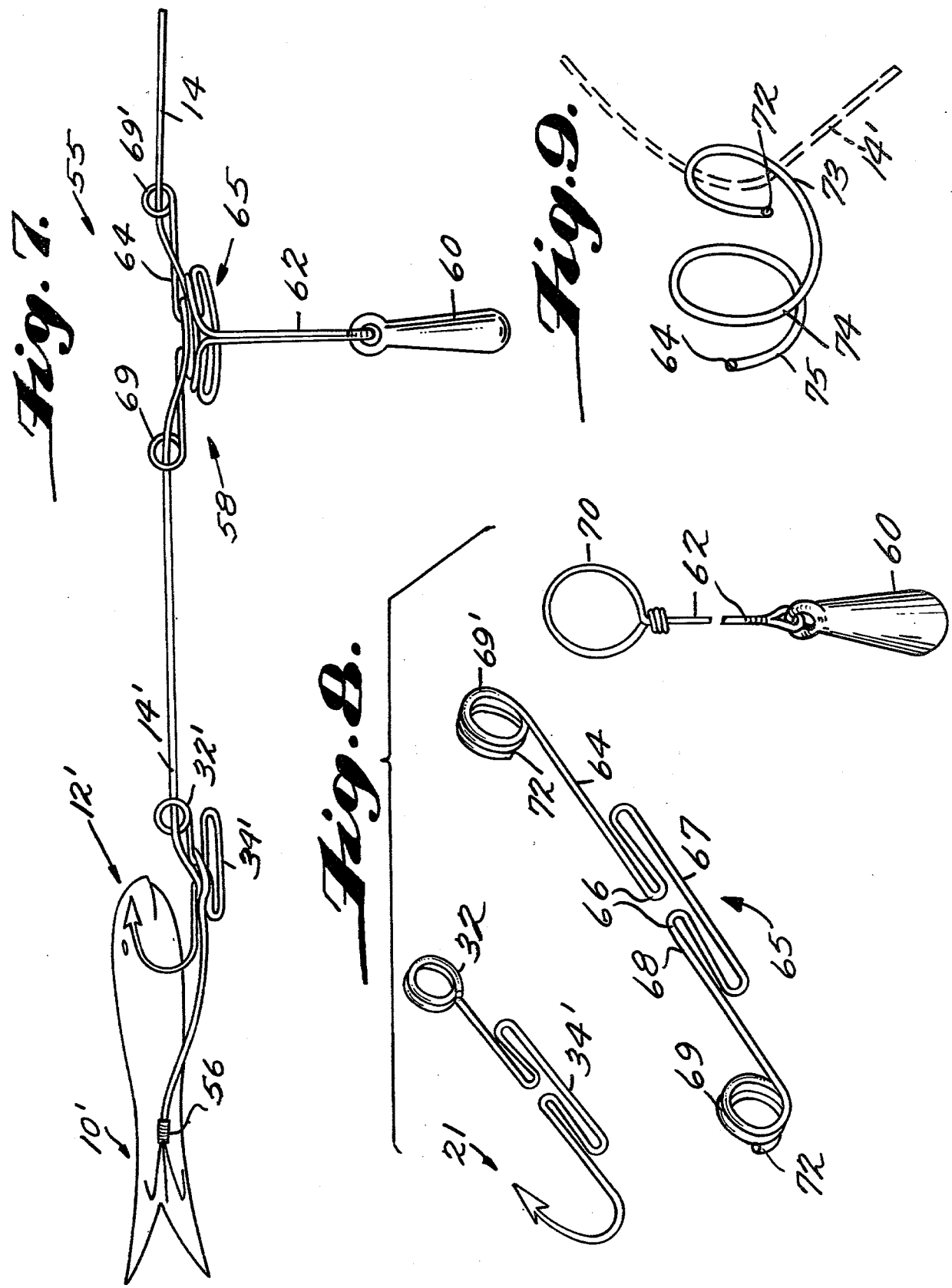

4,209,933

FISHING RIG ASSEMBLY

CROSS-REFERENCE TO RELATED APPLICATIONS

This application is a Continuation-in-Part of my application Ser. No. 779,547, filed Mar. 21, 1977, now U.S. Pat. No. 4,107,866.

BACKGROUND AND SUMMARY OF THE INVENTION

Minnow rigs are extremely popular for stream fishing and for trolling. A minnow rig that is effective holds a live minnow in a natural position, the minnow being hooked in such a way that a game fish attempting to swallow the minnow is hooked.

Conventional minnow rigs on the market usually comprise a treble hook at a free end of the line with a single hook spaced a predetermined distance along the line from the treble hook and securely tied to the line (at the factory) by a friction knot that secures the single hook shank and the line so as to hold the minnow in position. Such conventional rigs are not readily adaptable to minnows of different size, and may cause the minnow to be doubled up, rendering it useless as effective bait. Additionally, the snagging of a hook also can cause movement of the single hook with respect to the treble hook, killing the minnow or otherwise rendering it ineffective as bait. Other commercially available minnow rigs have similar problems associated therewith, the rigs either being too bulky or being arranged in such a way that they often result in the minnow being killed or held in an unnatural position.

When fishing with minnow rigs, and in other situations where it is desirable to hook a sinker in a line and adjust its position along the line, it is often difficult with conventional arrangements to properly adjust the sinker position along the line, and to insert the sinker into operative position with the line once the minnow rig, or other hook, has been connected to the line end.

According to the present invention, a minnow rig is provided that generally eliminates the drawbacks inherent in prior art commercially available minnow rigs, and a sinker attachment for a line for use with minnow rigs, or other hooks, is provided which allows for attachment of the sinker in the line even after the minnow rig or hook have been connected to the line, and allows ready adjustment of the sinker position along the line.

According to the present invention, a fishing rig assembly is provided comprising a hook; a first line; means formed on the hook for operative connection to the first line, and end of the first line connected to the hook; a sinker attachment means for operatively attaching a sinker to the first line for adjustment along the first line, the sinker attachment means consisting of an integral body including a generally T-shaped projection, the generally T-shaped projection consisting of a first portion operatively connected to the body portion, a second enlarged portion spaced from the body portion, and a third portion interconnecting the second large portion to the body portion, first and second surface manifestations formed on either side of the generally T-shaped projection and in line with each other and the generally T-shaped projection, the surface manifestations and the projection being spaced a fixed predetermined distance apart; a sinker; a second line operatively connected to the sinker at one end thereof and looped at the other end thereof, the looped end disposed wrapped around the generally T-shaped projection; and the first line received by the first and second surface manifestations and wrapped around the generally T-shaped projection. Preferably, the sinker attachment means comprises a wire bent so that eyelets are formed as the first and second surface manifestations, and other bent portions forming the T-shaped projection, the eyelets formed so that a middle portion of the first line may be moved from exterior each eyelet to being complete received thereby, and the third portion of the generally T-shaped projection being relatively short compared to the thickness of the first and second lines, so that the first line and the second line looped end will be tightly frictionally engaged by both the first and second portions of the generally T-shaped projection when the lines are wrapped around the generally T-shaped projection. Preferably, the wire portions forming the eyelets and the generally T-shaped projection are disposed in a common plane.

The hook of the assembly of the present invention preferably comprises part of a minnow rig. The minnow rig includes a first hook adapted to be disposed in a tail portion of a live minnow, a second hook adapted to be disposed in a head portion of a live minnow, and a single line. The first hook includes a portion for connection to a free end of the line, and the rig additionally comprises means integrally connected to the second hook for effecting connection of the single line to the second hook by friction wrapping for holding the second hook in a predetermined fixed relative position with respect to the first hook along the line. The term "friction wrapping" as used in the present specification and claims refers to knotless connection of a line to a structure by the line.

It is the primary object of the present invention to provide an improved fishing rig assembly. This and other objects of the invention will become clear from an inspection of the detailed description of the invention, and from the appended claims.

BRIEF DESCRIPTION OF THE DRAWINGS

FIGS. 4a–6a and FIGS. 4b–6b are side and top plan views respectively of modifications of the second hook for the minnow rig of FIG. 2;

FIG. 7 is a schematic side-view showing an exemplary fishing rig assembly according to the invention;

FIG. 8 is a perspective view of the major disassembled components of FIG. 7; and FIG. 9 is a schematic view showing insertion of a middle portion of a line into an eyelet.

DETAILED DESCRIPTION OF THE INVENTION

Figure 1:
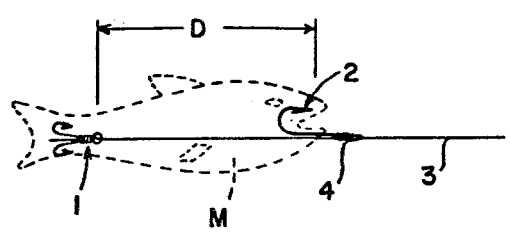
FIG. 1 is a schematic view showing a conventional commercial minnow rig mounting the minnow, which rig is usable with the assembly according to the invention.

A commercially available prior art minnow rig utilizable with the assembly according to the invention is shown schematically in FIG. 1 including a treble hook 1 disposed in the tail of a minnow M, a single hook 2, a line 3 and a further line 4 tied with a friction knot for attaching the hook 2 to the line 3. Normally, the minnow rig shown in FIG. 1 comes from the factory with the line 4 securing the hook 2 to the line 3, and if this is not the case, then it is necessary for the user to tie the hook 2 to the line 3 with a line 4 after the hook 2 has been placed in the minnow's mouth.

An exemplary minnow rig according to my parent application Ser. No. 779,547, now U.S. Pat. No. 4,107,866, is shown schematically in FIG. 2 including a first hook 10 (preferably a treble hook), a second hook 12 (preferably a single hook), a single line 14, a portion 16 (such as a loop) of the first hook 10 for connecting a free end of the line 14 to the hook 10, and means 18 integrally connected to the second hook 12 for effecting connection of the single line 14 to the second hook 12 by friction wrapping for holding the second hook 12 in a predetermined fixed relative position with respect to the first hook 10 along the line 14. Using the minnow rig according to the present invention the distance D' between the first hook 10 and the second hook 12 may be adjusted, it being possible to tie the second hook 12 to the line 14 after or just prior to insertion of the hook 12 into the mouth of the minnow M without difficulty. The hook 12 and means 18 together comprise an article of manufacture for connection to a continuous strand (14) without knotting of the strand and without accessory securing devices.

The means 18 includes an integral body member or body portion 20, an integral upstanding formation 22 (see FIG. 3b) having a first portion 23 connected to the body portion 20, a second enlarged portion 24 spaced from the body portion 20, and a third portion 25 interconnecting the second portion 24 and the first portion 23. The line 14 may be wrapped around the third portion 25 of the integral upstanding formation 22. A first strand or line (14) receiving surface manifestation 26 is formed in body member 20, and a second strand-receiving surface manifestation 28 is also formed in the body member 20, the upstanding formation 22, and the first and second surface manifestations 26, 28 being arranged generally in a linear relationship with the first and second surface manifestations 26, 28 on opposite sides of the upstanding formation 22.

Figure 2:
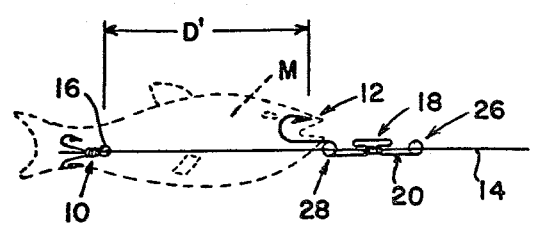
FIG. 2 is a schematic showing of a further exemplary apparatus for mounting a minnow, usable with the assembly according to the invention.
Figure 3A:
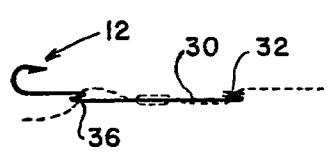
FIG. 3a is a side view of the second hook of FIG. 2
Figure 3B:
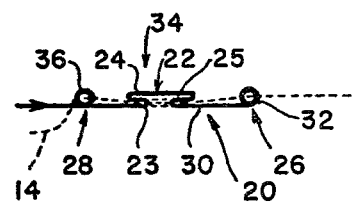
FIG. 3b is a top plan view of the second hook of FIG. 2.

The body member 20 may take a variety of forms such as a continuous wire 30 shown in FIGS. 2, 3a and 3b. The first surface manifestation 26 of the continuous wire 30 is formed as a first eyelet 32 by bending of the wire 30, the integral upstanding formation 22 is formed as a generally T-shaped projection 34 by bending of the wire 30, and the second surface manifestation 28 is formed as an eyelet 36 by bending of the wire 30. The hook 12 may be formed of the same wire as the body 30, but in any event is integral with the body 30.

Another form that the body member 30 might take is shown in FIGS. 4a, 4b, 5a and 5b, and comprises a plate 38 (the plate 38 need not be planar but may be arched or have a curved contour). The first surface manifestation 26 is formed as a first punched portion 40 which upstands from the surface of the plate 38 for receipt of a line 14 between the bottom of the portion 40 and the top of the plate 38. Preferably, a second, oppositely oriented punched portion 40' is also provided on the same side of the upstanding formation 22 as the first punched portion 40. The upstanding formation 22 preferably comprises a generally T-shaped projection 41 which is punched from the plate 38 and is spaced from the surface of the plate 38 so that a line 14 may be wrapped around the leg portion of the projection 41 between the projection 41 and the top of the plate 38. The second surface manifestation 28 comprises a second punched portion 42 comparable to the first punched portion 40, and another punched portion 42' may be provided on the same side of the generally T-shaped projection 41 as the punched portion 42.

Figure 5A:
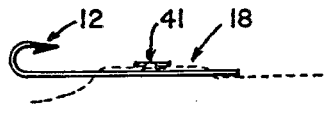
Figure 5B:
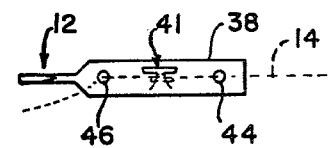

As shown in FIGS. 5a and 5b, when a plate 38 is provided with a generally T-shaped projection 41, the surface manifestations 26, 28 may take a different form than the punched portions 40, 42 such as a first opening 44 and a second opening 46.

Figure 6A:
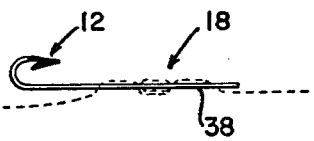
Figure 6B:
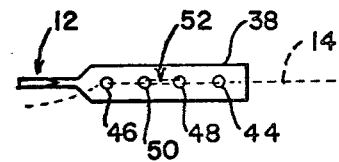

As shown in FIGS. 6a and 6b, the plate 38 may have a place of the generally T-shaped projection 41 a pair of middle openings including a first middle opening 48 and a second middle opening 50, the openings 44 and 46 forming a first end opening and second end opening respectively. A connecting solid piece 52, which is a portion of the plate 38, extends between the two middle openings 48, 50.

Figure 4A:
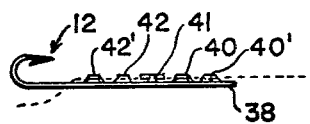
Figure 4B:
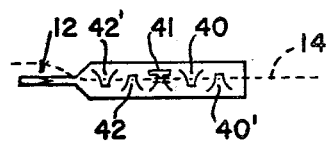

As can be seen by an inspection of the structures of 3b–6b, the means 18 effects securement of the second hook 12 to the single line 14 without knotting and without accessory fastening devices by providing for friction wrapping of the line 14. In the FIG. 3b and 5b embodiments, the line 14 passes through eyelets 32 or opening 44 respectively, is wrapped several times around the leg of the generally T-shaped projection 34 or 41 respectively, and then is passed through the second eyelet 36 or second opening 46 respectively, and on to the portion 16 of first hook 10. Since it is not necessary to tie a knot to secure the line 14 to the hook 12, the entire article can be adjusted (the distance D' adjusted) depending upon the size of the minnow M yet the hook 12 can be secured to the line 14 so that the distance D' remains constant after friction wrapping. The structure of FIG. 4b is utilized in the same manner as the structure of 5b except that instead of passing the line through openings 44 and 46, the line is disposed between the top of the plate 38 and the bottoms of portions 40, 42, the portions 40 and 42 tightly engaging the line 14 and holding it in place. The structure of FIG. 6b is utilized in the same manner as the structure of 5b except that the line 14 is passed through the first and second middle openings 48, 50 several times to wrap the line around the connecting solid piece 52 before the line is passed through the opening 46.

The same concepts of allowing ready adjustable attachment of the second hook 12 of the minnow rig illustrated in FIGS. 2 through 6 to the line 14 can be utilized to connect a sinker in a fishing rig assembly according to the present invention, illustrated generally at 55 and FIG. 7. The assembly 55 includes a hook 10', a first line 14', means 56 formed on the hook 10' for operative connection of the first line 14' thereto, an end of the first line 14' connected to the means 56, sinker attachment means 58, a sinker 60, and a second line 62 operatively connecting the sinker to the sinker attachment means 58.

As shown most clearly in FIGS. 7 and 8, the sinker attachment means comprises means for operatively attaching sinker 60 to the first line 14' for ready adjustment along the first line 14', the means 58 consisting of an integral body portion 64, including a generally T-shaped projection 65. The generally T-shaped projection consists of a first portion 66 operatively connected to the body portion 64, a second, enlarged portion 67 spaced from the body portion 64, and a third portion 68 interconnecting the second portion 67 to the body portion 64. The means 58 further includes first and second surface manifestations 69, 69' formed on either side of the projection 65 and in line with each other and the projection 65, the surface manifestations 69, 69' and the projection 65 being spaced a fixed predetermined distance apart. The second line 62 is connected at one end thereof to the sinker 60, and the other end 70 thereof is looped, looped end 70 disposed wrapped around the projection 65. The first line 14' is received by the first and second surface manifestations 69, 69' (see FIG. 7), and wrapped around the T-shaped projection 65.

While the surface manifestations 69, 69', and the T-shaped projection 65 of the means 58 may take any one of the comparable forms illustrated in FIGS. 3 through 6, it is especially advantageous to provide the means 58 as a wire having bent portions forming the T-shaped projections 65 and eyelets forming the first and second surface manifestations. Preferably, the eyelets are formed so that a middle portion of the first line 14' may be moved from exterior each eyelet to be completely received by the eyelet, and in this way the means 58 may be inserted directly into the line 14' without threading an end of the line 14' through the eyelets 69, 69'. Such a formation of the eyelets is shown particularly with reference to FIG. 9. In FIG. 9, the relative positions of the bent wire components forming the eyelet in the direction T transverse to the body portion 64 is shown greatly exaggerated for clarity. As shown in FIG. 9, the eyelet includes the end wire portion 72 and a first coil portion 73, a second coil portion 74, and a third coil portion 75 forming the inner periphery of the eyelet opening. Line 14' is inserted between the end 72 and the first coil 73, and then the portion of line 14' inserted between 72 and 73 is rotated around, following the contour of the portions 73, 74, and 75, until it pops free of engagement therewith, and is completely received by the opening of the eyelet.

As shown in FIGS. 7 and 8, it is preferred that the wire portions forming the eyelets and the projection 65 of the means 58 are disposed in a common plane, and additionally it is preferred that the third portion 68 is relatively short compared to the thickness of the first and second lines 14', 62, so that the first line 14' and the looped end 70 of the second line 62 will be tightly frictionally engaged by both the first and second portions 66, 67 of the means 58 when the lines are wrapped around the generally T-shaped projection 65.

As previously mentioned, the hook 10' preferably comprises part of a minnow rig, the minnow rig being clearly illustrated in FIGS. 2 through 6. The second hook of the minnow rig shown in the embodiments of FIGS. 7 and 8 at 12' is like that illllustrated in FIGS. 3a and 3b except that only one surface manifestation 32' is provided, and the hook 12', generally T-shaped projection 34', and the eyelet 32' are disposed in the same plane. The eyelet 32' preferably is formed like the eyelet shown in FIG. 9 so that a middle portion of the line 14' may be inserted to be received by the opening thereof.

It will thus be seen that according to the present invention, a fishing rig assembly has been provided, especially adapted for use with minnow rigs, which allows for ready insertion of a sinker into a line, and for adjustment of the sinker position along the line. To adjust the sinker position, it is merely necessary to unwrap line 14' from around the T-shaped projection 65, move the line through the eyelets 69, 69' until the new position is reached, and then wrap portions of the line 14' around the manifestation 65 again. To detach the sinker, it is merely necessary to remove the looped end 70 from wrapped engagement with the T-shaped projection 65, so that the looped projection 70 is no longer tightly frictionally engaged by the first and second portions 66, 67 thereof.

While the invention has been herein shown and described, it is presently conceived to be the most practical and preferred embodiment thereof, and it will be apparent to those of ordinary skill in the art, that many modifications may be made thereof within the scope of the invention. For instance, the generally T-shaped projection could under some circumstances be other than integrally connected to the body member—it could be brazed, soldered, or otherwise connected thereto. Thus the scope which is to be accorded to the present invention is the broadest interpretation of the appended claims, so that all equivalent structures and devices are encompassed.

What is claimed is:

1. A fishing rig assembly comprising
   a hook,
   a first line,
   means formed on said hook for operative connection of said first line thereto, an end of said first line connected to said means,
   a sinker attachment means for operatively attaching a sinker to said first line for adjustment along said first line, said sinker attachment means consisting of an intergral body including a T-shaped projection; said generally T-shaped projection consisting of a first portion operatively connected to said body portion, a second, enlarged portion spaced from said body portion, and a third portion interconnecting said second enlarged portion to said body portion; first and second surface manifestations formed on either side of said generally T-shaped projection, and generally in-line with each other and said generally T-shaped projection, said surface manifestations and said projection being spaced a fixed predetermined distance apart,
   a sinker,
   a second line operatively connected to said sinker at one end thereof and looped at the other end thereof, said looped end disposed wrapped around said generally T-shaped projection, and
   said first line received by said first and second surface manifestations, and wrapped around said generally T-shaped projection; and wherein said third portion of said generally T-shaped projection is relatively short compared to the thickness of said first and second lines, so that said first line and said second line looped end will together be operatively tightly frictionally engaged by both said first and second portions when the lines are wrapped around said generally T-shaped projection.

2. An assembly as recited in claim 1 wherein said sinker attachment means integral body comprises a wire, and wherein said first and second surface manifestations each comprise an eyelet formed from bending of said wire, bent portions of said wire forming said generally T-shaped projection also.

3. An assembly as recited in claim 2 wherein each of said eyelets is formed so that a middle portion of said first line may be moved from exterior each said eyelet to being completely received thereby.

4. An assembly as recited in claim 2 wherein the wire portions forming said eyelets and said generally T-shaped projection are disposed in a common plane.

5. An assembly as recited in claim 1, wherein said hook comprises a first hook adapted to be disposed in a tail portion of a live minnow and said assembly further comprises a second hook adapted to be disposed in a head portion of a live minnow, and means integrally connected to said second hook for effecting connection of said first line to said second hook by friction wrapping for holding said second hook in a predetermined fixed relative position with respect to said first hook along said first line, said means consisting of at least a first surface manifestation for receiving said first line, formed on one side of a generally T-shaped projection; said at least one surface manifestation and said projection disposed in-line, substantially parallel to the direction said line takes when connected up to said hooks; and said surface manifestation and said projection being spaced a fixed predetermined distance apart.

6. An assembly as recited in claim 5 wherein said means integrally connected to said second hook comprises a wire; said wire bent in such a manner that adjacent said second hook a first eyelet is formed comprising said first surface manifestation, bent portion of said wire forming said generally T-shaped projection also.

7. An assembly as recited in claim 6 wherein said second hook, said wire portions forming said first eyelet, and said wire portion forming said generally T-shaped projection are disposed in a common plane.

8. An assembly as recited in claim 6 wherein said first eyelet is formed so that a middle portion of said first line may be moved from exterior said first eyelet to being completely received thereby.

9. An assembly as recited in claim 6 wherein said at least one surface manifestation of said means integrally connected to said second hook comprises first and second surface manifestations, each formed as an eyelet by bending said wire, and disposed in-line with said generally T-shaped projection and on opposite sides thereof.

* * * * *